United States Patent [19]

Freymann

[11] Patent Number: 4,675,805
[45] Date of Patent: Jun. 23, 1987

[54] METHOD AND DEVICE FOR ADJUSTING THE PID CHARACTERISTICS OF CONTROLLER COMPENSATING NETWORKS, PARTICULARLY IN HYDRAULIC PULSING MACHINES

[75] Inventor: Raymond Freymann, Gottingen, Fed. Rep. of Germany

[73] Assignee: Deutsche Forschungs- und Versuchsanstalt für Luft-und Raumfahrt e.V., Fed. Rep. of Germany

[21] Appl. No.: 643,265

[22] Filed: Aug. 21, 1984

[30] Foreign Application Priority Data

Aug. 22, 1983 [DE] Fed. Rep. of Germany ....... 3330233

[51] Int. Cl.[4] .............................................. G05B 11/36
[52] U.S. Cl. .................................... 364/162; 364/158; 364/553
[58] Field of Search .............. 364/161, 162, 163, 576, 364/158, 159, 553; 318/609, 610

[56] References Cited

U.S. PATENT DOCUMENTS

| 3,586,846 | 6/1971 | Ley | 364/553 |
| 3,718,813 | 2/1973 | Williams | 364/553 |
| 3,798,426 | 3/1974 | Bristol, II | 364/158 |
| 3,973,112 | 8/1976 | Sloane | 364/553 |
| 4,466,054 | 8/1984 | Shigemasa et al. | 318/610 |
| 4,549,123 | 10/1985 | Hagglund | 364/162 |

OTHER PUBLICATIONS

Feedback and Control Systems; Schaum's Outline Series; J. DiStefano et al; McGraw-Hill; N.Y., N.Y.; 1967.

Dynamic Testing Instruments; *Wireless World*; by James Franklin; Oct. 1966; pp. 513–518.

*Primary Examiner*—Jerry Smith
*Assistant Examiner*—Allen MacDonald
*Attorney, Agent, or Firm*—Thomas & Kennedy

[57] ABSTRACT

PID characteristics of a closed-loop type controller compensation network for a hydraulic pulsing machine coupled with a test specimen are adjusted by determining the closed-loop stability locus of the network and adjusting PID characteristics until the stability locus is located at a desired position.

2 Claims, 17 Drawing Figures

METHOD AND DEVICE FOR ADJUSTING THE PID CHARACTERISTICS OF CONTROLLER COMPENSATING NETWORKS, PARTICULARLY IN HYDRAULIC PULSING MACHINES

BACKGROUND OF THE INVENTION

The invention relates to a method and a device for adjusting the PID characteristics of controller compensating networks, particularly in hydraulic pulsing machines and a method for monitoring changes in time on test specimens examined by means of hydraulic pulsing machines.

Hydraulic pulsing machines are usually used for determining and investigating the elasto-mechanical behavior of test specimens. They are known to contain a controller compensating network which requires careful adjustment before each examination. The aim is considered to be that of achieving good agreement in the time characteristic between the set-value quantity and the controlled quantity. For this, the PID characteristics of the controller compensating network must be suitably adjusted. Since the transfer characteristics of the controlled system are a function of the test set-up/test specimen, it can be recognized that the PID setting of the compensating network must be adjusted to the respective test set-up/test specimen for each test.

The method most frequently used in practice consists in adjusting the compensating network with the aid of step functions. In this method, the control loop is supplied with a step function via the set-value input and the variation in time of the response of the controlled quantity to the step signal is observed. The PID setting of the compensating network is considered to be satisfactory when the controlled quantity settles in minimum time at the final value of the step and the overshoot displayed by the controlled quantity around the final value of the step is small.

These two demands are contradictory. The first condition requires a high control-loop gain which, however, reduces the stability in the control loop and thus leads to unfavorable overshoot characteristics, thus contradicting the second requirement. In consequence, the demands with respect to good control accuracy and good stability of the control loop differ. It is frequently found to be difficult to achieve optimization during the adjustment of the PID characteristics of the controller compensating network with the aid of step functions. This applies especially if the test set-up/test specimen involves more complicated elasto-mechanical structures. Mention is made, for example, of the case where a test specimen displays, in a frequency range of interest, one or several characteristic frequencies which are attributable to its natural structural characteristics of vibration. In such difficult cases, even the experienced test engineer frequently lacks an understanding to draw conclusions concerning the optimum setting of the compensating network only by means of the step response of the controlled quantity. The reason for this is that the information content of the step response signal is too low, especially in these difficult cases.

A further disadvantage in adjusting the compensation network via step functions has also been found to be that the hard step signal can destroy the test setup/test specimen. The recommendation of the manufacturers of the hydraulic pulsing machines to carry out the PID adjustment in this case with dummy test specimens can often not be implemented for economic reasons because of the structural complexity of the test set-up/test specimen. In addition, the gradient of the force signal generated by the hydraulic pulsing cylinder cannot be considered to be infinitely steep. Because of the fact that the step function is not ideally steep, it is thus only possible to excite the test set-up/test specimen within a limited lower frequency range. It is quite conceivable that a high-frequency instability of the system will remain undiscovered during a step excitation.

SUMMARY OF THE INVENTION

The invention has the aim of creating a method for adjusting the PID characteristics of controller compensating networks, which does not display the above-mentioned defects and which allows even less experienced test engineers to carry out the adjustment in optimum manner even with complicated test specimens and to proceed selectively in accordance with well-defined instructions without running the risk of destroying the test specimen and without the need for lengthy adjustment work.

A further aim of the invention consists in monitoring also the behavior of test specimens during long-term tests. In addition, it is intended to demonstrate a device by means of which the method can be carried out.

According to the invention, the method is characterized by the fact that with the control loop being *closed*, its stability locus is determined and the controller compensating network is adjusted until the stability locus has a desired characteristic. Suitably, a transform of the so-called Nyquist locus is used as the stability locus. The controller setting can be optimized in this manner in accordance with clearly formulated instructions and it is possible to detect the controller stability limit quantitatively in the form of a gain and phase margin and to check the controller stability in the whole frequency range so that the controller setting can be selectively optimized even in the case of test set-ups which are elasto-mechanically difficult. The control loop is preferably supplied with a wide-band set-value signal and the resultant actual-value signal is measured and both signals are correlated with each other in order to determine the stability locus. A so-called sinusoidal sweep signal or even a random signal are particularly suitable as set-value signals.

The method for monitoring changes in time on test specimens is characterized by the fact that, with the control loop closed, its stability loci are determined at different points in time and are continuously compared with each other (in a comparator). A change in the dynamic behavior of the test set-up/test specimen entails a change in the transfer characteristic of the controlled system which can be determined with the aid of the locus so that early changes in the elasto-mechanical behavior of the test specimen can be detected and a test can, if necessary, be terminated early in order to prevent destruction of the test specimen and consequential damages resulting therefrom. For this purpose, the measured values obtained for the continuous stability locus determination are advantageously recorded and stored. In other respects, the procedure corresponds to that for adjusting the controller network, there being no further need for the control loop to be adjusted by the test engineer during the monitoring.

The device for carrying out the method is characterized by a sine-wave generator for generating the set value and a vector component meter for detecting the actual and set values of the closed control loop. The vector component meter is preferably followed in the circuit by an X/Y recorder for direct representation of the locus. A further device for carrying out the method is characterized by a function generator for generating the set value and a Fourier analyzer for processing the actual and set values of the closed control loop. The Fourier analyzer is suitably associated with a storage oscilloscope for displaying the stability locus measured. For storing the measured values, the Fourier analyzer is preferably associated with a data memory. With particular advantage, the Fourier analyzer is in this arrangement associated with a comparator for comparing the measured values contained in the data memory with the measured values newly received, thereby providing the possibility of automatic operation and, if necessary, automatic system switch-off. The Fourier analyzer, the data memory and the comparator are suitable facilities which operate by means of digital processes and which can contain at least one computer.

BRIEF DESCRIPTION OF THE DRAWINGS

In the text which follows, the invention is explained in detail with the aid of the attached drawings in which.

DETAILED DESCRIPTION

Figure 1A:
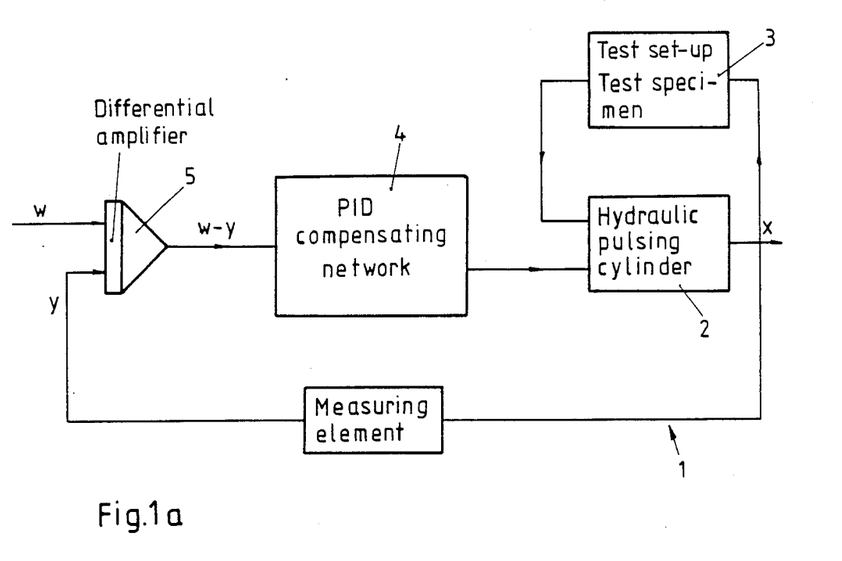
FIG. 1a shows a schematic block diagram of an hydraulic pulsing system.

FIG. 1a shows a schematic representation of the block diagram of an hydraulic pulsing system 1 and the associated control facilities. In this arrangement, the hydraulic pulsing cylinder 2 acts on the test set-up or test specimen 3. The hydraulic pulsing cylinder 2 is controlled in this arrangement via the PID compensating network 4 to which a set-value signal w is supplied. Simultaneously, the compensating network 4 is supplied with the resultant actual-value signal y. This is suitably done via a differential amplifier 5 in which the set-value signal w and the actual-value signal y are subtracted from each other so that the compensating network 4 is supplied only with the difference signal w−y.

A number of methods for considering stability in *open* (cut-open) control loops are specified in the relevant literature. In the best known of these methods, the procedure consists of determining the stability of the closed control loop from the transfer characteristics of the open control loop (Nyquist stability criterion). However, this procedure is meaningful for practical application only if it is possible to determine the locus of the open control loop experimentally.

Figure 1B:
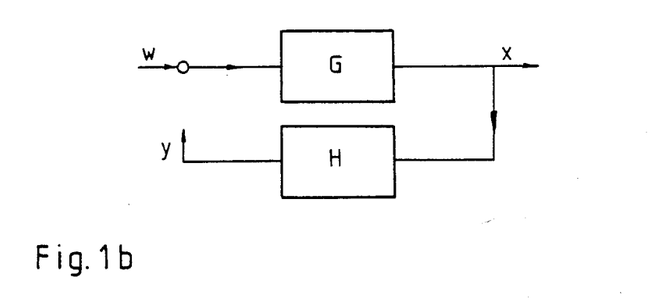
FIG. 1b shows a schematic block diagram of an open control loop.

For the control loop, shown in FIG. 1a, of an hydraulic pulsing machine, the block diagram drawn in FIG. 1b for the open control loop can be specified in a simplified manner. In this arrangement, the transfer function of the forward-acting branch consisting of the PID compensating network, the hydraulic pulsing cylinder and the test set-up/test specimen, is designated by G and the transfer function of the backward-acting branch containing the measuring element is designated by H. The transfer function F of the open control loop can be written as:

$$F = y/w = G \times H \qquad (1)$$

The Nyquist stability criterion states;

(a) A closed control loop is stable only when the locus of the transfer function of the open control loop F does not enclose the point $(-1, i \times o)$—in the case where this transfer function does not have any (unstable) poles with positive real components.

(b) If the transfer function of the open control loop has n poles with a positive real component, the closed control loop is stable only when the locus of the transfer function of the open control loop encloses the point $(-1, i \times o)$ n-times counterclockwise.

For the dynamic investigations relevant in this case, only item (a) is of significance since it can be assumed that the transfer function of the open control loop of an hydraulic pulsing machine (including the test set-up/test specimen) is *dynamically stable.*

Figure 2:
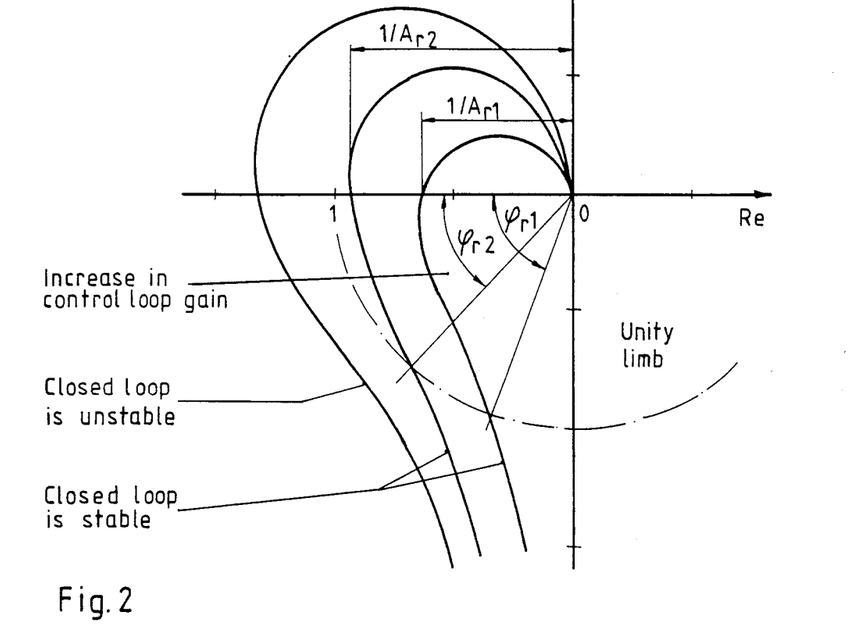
FIG. 2 shows a schematic diagram for representing Nyquist loci.

In addition to the absolute stability of a control loop, the Nyquist locus diagram also provides information on the relative stability of the closed control loop. As shown in FIG. 2, the relative stability is specified in the form of a gain margin Ar and a phase margin $\phi$r. These stability values are defined as follows:

Ar: The factor by which the loop gain must be increased so that $/F/ = 1$ with $\phi = 180°$ $\phi$r: The additional phase angle which must occur so that $/F/ = 1$ with $\phi = 180°$.

Figure 3:
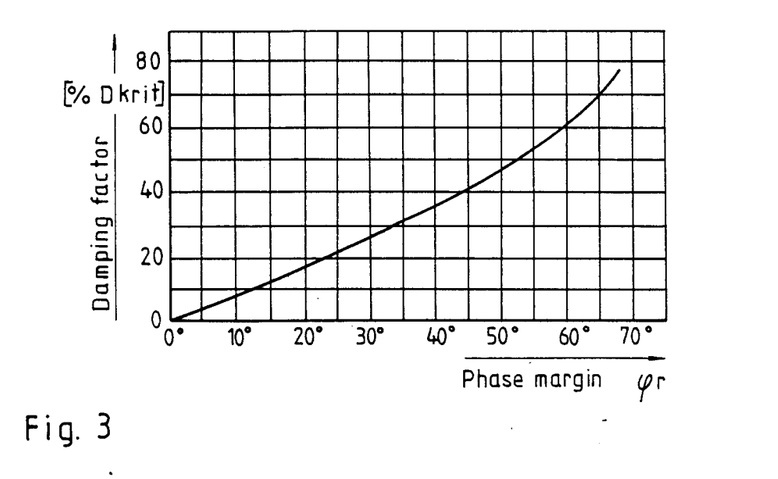
FIG. 3 shows a schematic diagram for representing the connection between damping factor and phase margin for a second-order system.

There is a clear connection—at least for second-order systems—between the phase margin and the damping factor of the closed control loop (FIG. 3). The connection shown in this Figure applies in a first approximation also if the control loop is a higher-order system, the transient characteristic of which, however, is predominantly determined by a pair of dominating under-damped radices (nulls of the polynomial of the denominator of the transfer function of the closed control loop). Depending on the case of application, the following guide values should be adhered to for satisfactory operation of the control loop: Ar=2.5 . . . 10 and $\phi$r=30° . . . 60°.

Figure 1C:
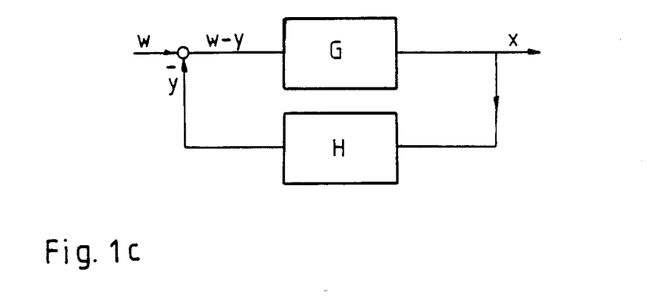
FIG. 1c shows the schematic block diagram of a closed control loop.

The considerations mentioned above show that a number of statements with regard to the stability characteristics of the closed control loop can be made as a result of the position of the Nyquist locus (for the open control loop). Unfortunately, it is not possible to determine the locus of the open control loop of an hydraulic pulsing machine directly experimentally because an hydraulic pulsing machine can be operated in a *statically stable* manner only in the closed control loop mode. Since, therefore, investigations into hydraulic pulsing machines can be carried out only with a closed control loop, it is important to create a method which allows conclusions regarding the characteristic of the Nyquist locus to be drawn from the transfer characteristic of the closed control loop, which is shown below:

The closed control loop of an hydraulic pulsing machine is shown schematically in FIG. 1c. The transfer function $(y/w)g$ can be written as:

$$(y/w)g = GH/(1+GH), \quad (2)$$

or, taking equation (1) into account:

$$(y/w)g = F/(1+F). \quad (3)$$

Further transformation of equation (3) provides:

$$(w/y)g = 1 + 1/F. \quad (4)$$

The frequency response of the transfer function $(w/y)g$ of hydraulic pulsing machines can be directly determined experimentally. For this, it is only necessary to determine the response of the actual value y to a wide-band known set-value signal w which is supplied from the outside, for example, in the form of a random or sinusoidal sweep signal and to correlate these two quantities wich each other.

Figure 4:
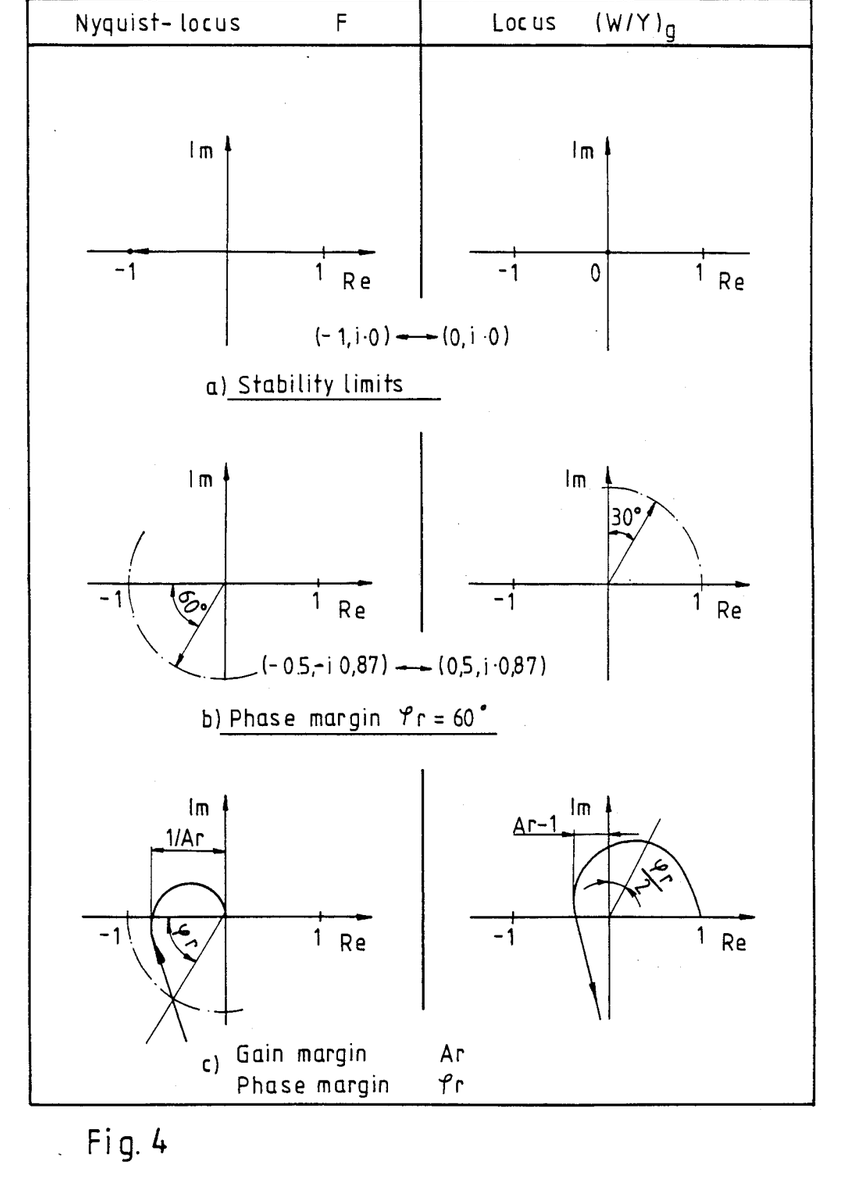
FIG. 4, with views a-c, shows schematic diagrams for representing the transition of the Nyquist locus to the transformed locus.

If a desired characteristic of the Nyquist locus—in the form of a phase and/or gain margin—is predetermined, equation (4) can be used to establish the corresponding characteristic values of the locus variation of $(w/y)g$. FIG. 4a shows that the point $(-1, i \times o)$, characterizing the stability of the closed control loop, of the locus F is transferred to point $(o, i \times o)$ of the locus $(w/y)g$ by mapping it in accordance with equation (4). Correspondingly, the following criterion applies to the dynamic stability of an hydraulic pulsing system:

The closed control loop is stable only when the locus of the transfer function $(w/y)g$ encloses the origin, for the case where the transfer function F does not have any (conjugate complex) poles with positive real components.

It is also possible, as shown in FIGS. 4b and 4c, to determine, by means of the locus $(w/y)g$, the gain margin Ar and the phase margin $\phi r$ by means of which conclusions can be drawn, on the basis of FIG. 3 with respect to the damping characteristic of the closed control loop. The statement can therefore be made that the locus $(w/y)g$ contains the same information as the Nyquist locus F. However, with respect to carrying out investigations into hydraulic pulsing machines, reference is made again to the fact that the locus $(w/y)g$ is directly measurable but that the locus F cannot be directly determined experimentally. On the basis of the findings obtained here, a practical way of proceeding to the optimum setting of the PID characteristics of controller compensating networks is specified in the following section.

In adjusting the PID characteristics of the controller compensating network, the following procedure is adopted:

(a) A phase margin $\phi r$ is predetermined as a function of the desired damping characteristics of the system (FIG. 3).

(b) During the adjusting process at the compensating network, the locus $(w/y)g$ is continuously measured for the hydraulic pulsing machine operated in closed control loop mode. During this (on-line) measurement, the PID adjustment of the compensating network is carried out iteratively. With respect to an optimum setting, it must be considered to be an aim to achieve the predetermined phase margin $\phi r$ with a gain margin which is still satisfactory.

It must be noted that:

(a) The position of the $(w/y)g$ locus can be rotated with the ID component of the compensating network;

(b) The diameter of the locus can be altered with the P component.

Since it is possible to adjust the P and ID components of the compensating network independently of each other, the diameter and the position of the locus $(w/y)g$ can be altered within wider ranges.

The following positive aspects, supporting an adjustment of the PID network on the basis of the locus $(w/y)g$, shall be listed below:

(a) The controller setting can be optimized in accordance with clear instructions.

(b) The effect of a change in the setting of the compensating network can be detected not only qualitatively but also quantitatively in the form of numerical values for the gain and phase margin. Quantitative information enables the even inexperienced test engineer to recognize how sensitively the $(w/y)g$ locus reacts to changes in the compensating network setting and in what way this locus approaches the stability limit. It can be clearly distinguished whether a system instability is caused by an inadequate phase margin or insufficient gain margin.

A risk-free increase in the gain (P component) of the compensating network up to extreme values is made possible only by the quantitative registering of the controller stability. This, in turn, leads to a reduction in control deviation.

(c) Because the control loop must be excited by the reference signal over a wide frequency range in the investigations to be carried out for the experimental determination of the locus $(w/y)g$, it can be assumed that even high-frequency instabilities will not remain undiscovered.

(d) Even (in-) stability effects attributable to the elasto-mechanical behavior of the test set-up/test specimen can be detected by means of the locus variation of $(w/y)g$. In these more difficult cases, it is quite conceivable that a predetermined phase margin cannot be attained. But the compensating network can be optimized up to the limit even in these cases with the aid of the method proposed here.

Practical examples will be shown below, using some test results.

An hydraulic pulsing machine is used in which the deflection of the hydraulic pulsing cylinder is controlled via a path controller. In the tests, the working piston of the hydraulic pulsing cylinder was loaded with a rigid mass.

Figure 5:
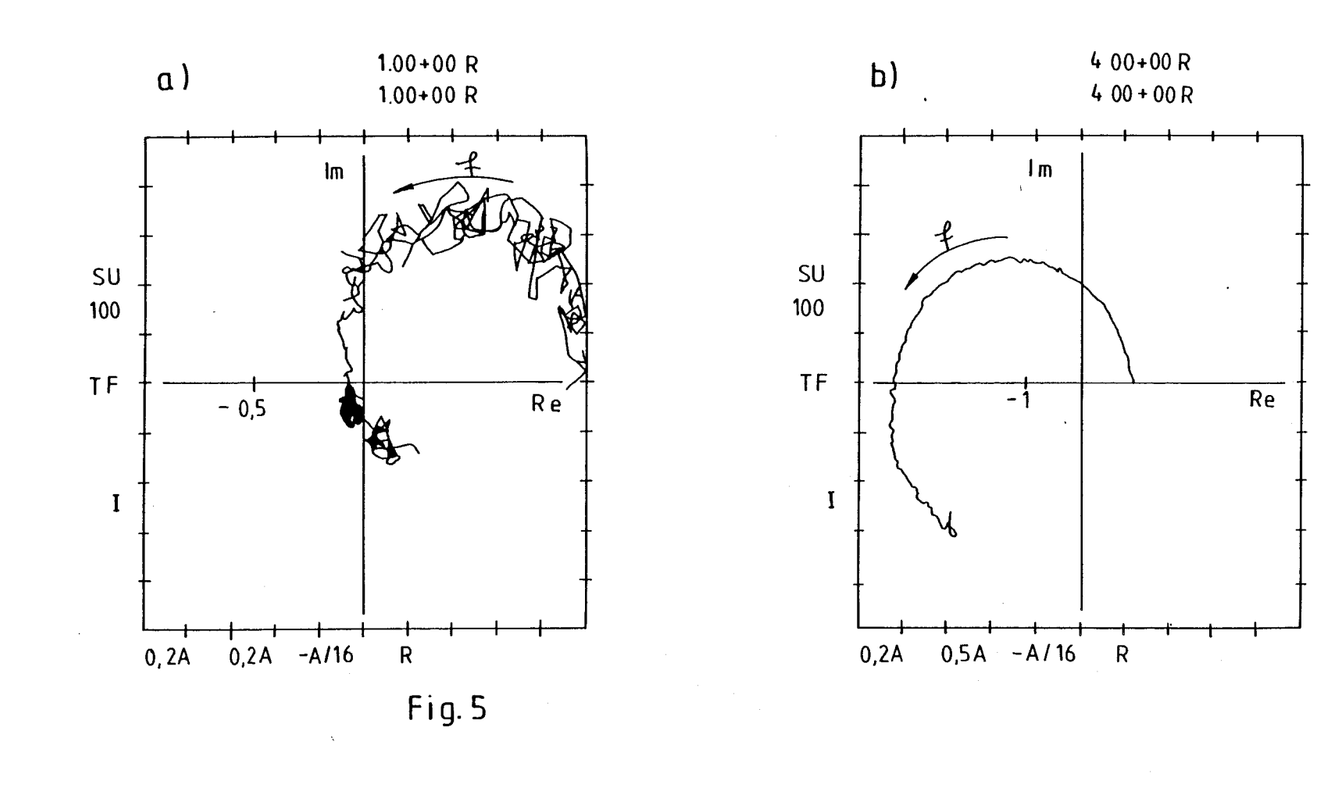
FIG. 5, with views a-f, show schematic representations of measured loci.

FIG. 5a shows the locus $(w/y)g$ measured for an hydraulic pulsing machine which is at the limit of stability. The gain margin is here only about Ar=1.1. FIG. 5b shows the locus $(w/y)g$ for a largely optimized setting of the controller compensating network. In this case, the phase margin $\phi r = 60°$ and the gain margin Ar=4.5.

FIGS. 5c to 5f show how the position of the locus $(w/y)g$ can be changed by varying the PID characteristics of the compensating network. FIGS. 5c and 5e show in each case the same reference locus. The difference between the loci shown in FIGS. 5c and 5d consists in the fact that the D component of the compensating network was increased in FIG. 5d. FIGS. 5e and 5f show how the locus (w/y)g changes with an increase in the P component (gain).

With reference to the effect of a change of the PID characteristics of controller compensating networks on the position of the locus (w/y)g, the following generally valid statement can be made:

(a) An increase in the P component reduces the diameter of the locus;

(b) An increase in the D component rotates the locus clockwise;

(c) An increase in the I component rotates the locus counterclockwise.

The results from experimental investigations given here illustrate the soundness of the method proposed here in practical applications. The results show that the controller stability limits can be clearly determined with this procedure. The (w/y)g locus can be used not only for determining that the stability limit of the system is reached, but also how it is reached (inadequate phase or gain margin). It is only this knowledge, which makes it possible to proceed selectively in setting the PID characteristics of controller compensating networks.

In the text which follows, a summary is given of the measuring instrumentation by means of which a continuous (On-line) analysis of the locus (w/y)g can be performed from the variation with time of the measured quantities w and y.

Figure 6:
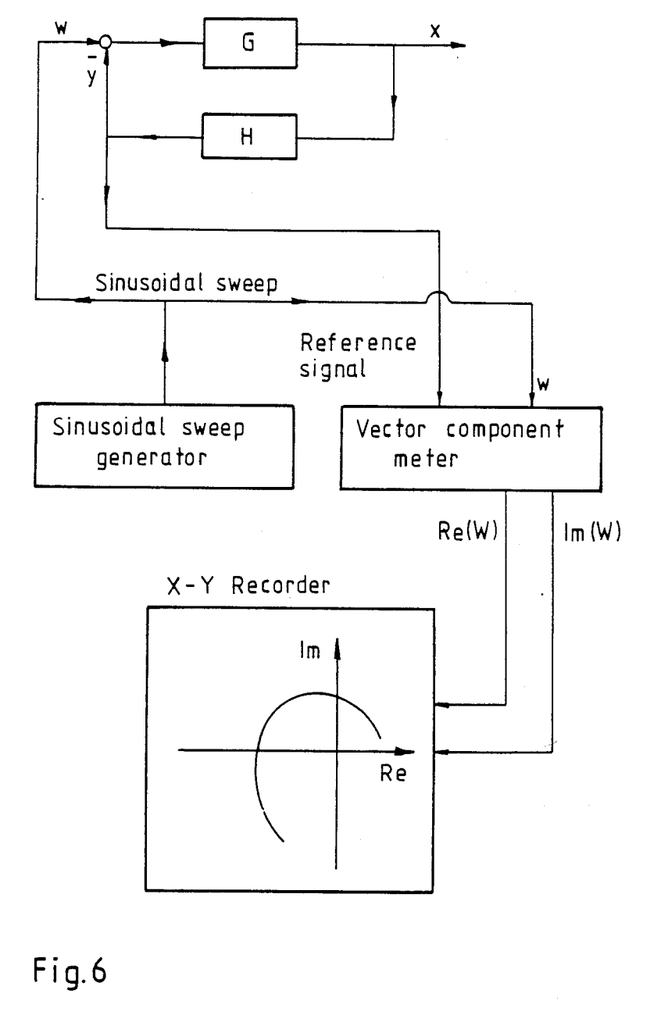
FIG. 6 shows a schematic block diagram of the device for measuring the locus with the aid of a convector component meter.

Various methods exist for generating the locus (w/y)g. One procedure consists in exciting the set-value input harmonically via a sine-wave generator at different frequencies and to correlate the set value w and the actual value with each other for each frequency setting with the aid of a vector component meter (FIG. 6). With this method, the locus can be rapidly generated if (a) the sine-wave generator feeds a (slow) frequency sweep into the control loop as a set-value signal, (b) the actual value is supplied to the vector component meter as a reference signal, (c) the direct voltages, present at the vector component meter, of the real and imaginary components of the set value w are plotted with the aid of an X/Y recorder directly in the form of a locus.

Figure 7:
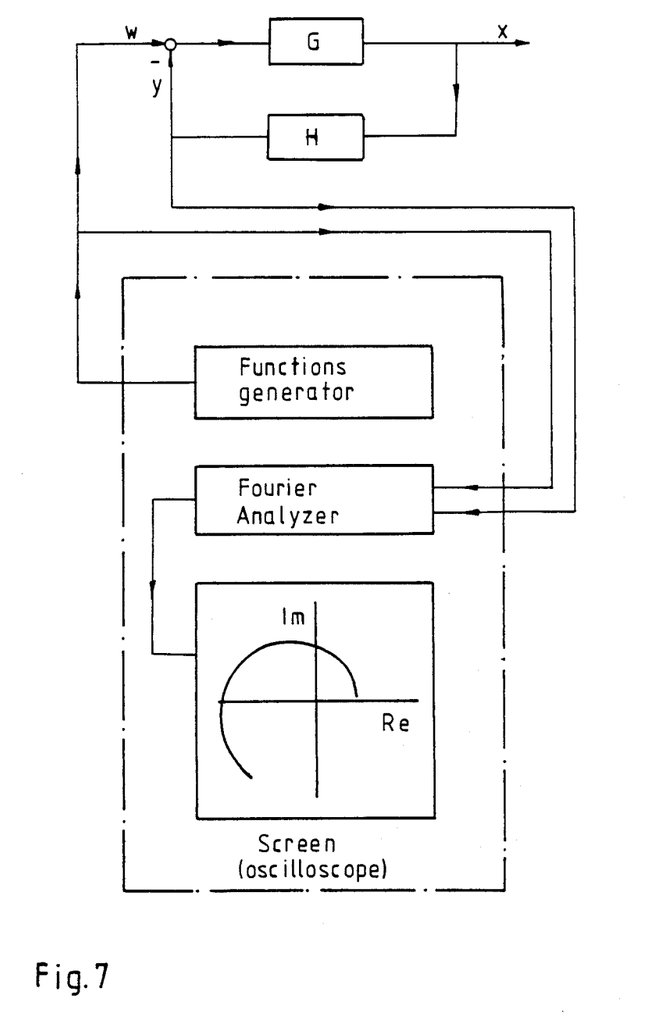
FIG. 7 shows a schematic block diagram of a device for measuring the locus by means of a Fourier analyzer.

Another possibility for generating the locus (w/y)g consists in transforming the set and actual values of the (closed) control loop with the aid of a Fourier analyzer from the time domain into the frequency domain and in calculating the frequency response (w/y)g between both quantities. This frequency response must then still be plotted in the form of a locus (FIG. 7).

High-capacity minicomputers can be used for the Fourier analysis. These computers can be combined with a function generator which can be used for generating the reference signal (here the set value w). The locus (w/y)g measured can also be directly displayed on a screen (storage oscilloscope).

The advantage of using these instruments, as compared with the vector component measuring technique, lies in its high data processing rate. With respect to using a Fourier analyzer system for the on-line monitoring of the controller adjusting process on hydraulic pulsing machines—on the basis of the method proposed here—some specifications are listed hereinunder which should be met in the measuring facility, surrounded by a dot-dashed frame in FIG. 7, for the application intended in this case.

(a) Function generator

A sine-wave generator with automatic frequency sweep facility is to be used.

The sweep rate should be a logarithmic function of the frequency so that sweeping is slow in the lower frequency range but fast in the higher frequency range. The duration of a sweep from 0 Hz to the top frequency should be about 15 seconds.

The frequency range should be adjustable in steps (for example first step: f=0 ... 50 Hz, 2nd step: f=0 ... 100 Hz, 3rd step: f=0 ... 150 Hz, 4th step: f=0 ... 200 Hz).

The amplitude of the generator output voltage must be continuously adjustable within a range of 0 ... ≈500 mV.

The generator should be provided with a sweep repetition facility so that, after the top sweep frequency has been reached, the instrument automatically jumps back to the starting frequency (0 Hz) and a new sweep run is started again.

(b) Fourier analyzer

One of the commercially available systems can be used. It is of advantage if the Fourier analysis of the total frequency range is carried out in steps for different overlapping frequency bands. The analysis should begin in the lower frequency range, which makes sense bcause the reference signal w is also swept from low to higher frequencies. Frequency band anaylsis probably provides the most rapid output of measurement results. Care must also be taken that the frequency ranges of the Fourier anaylzer agree with the ranges of the generator which can be set in steps.

(c) Screen

For displaying the locus (w/y)g on the storage oscilloscope screen, the form of Nyquist diagram used in commercially available instruments can be selected. However, it makes sense to mix in some numerical values providing the test engineer, for example, with information on the instantaneous values for the gain and phase margin on the screen.

No problems are caused by the series production of a Fourier analyzer instrument including the peripheral instruments described here. With respect to equipping hydraulic pulsing machines in quantity with a Fourier analyzer system, it makes sense to manufacture simple and small and, in consequence, also cheap instruments.

The following illustrates how the above-mentioned measuring equipment can be used by expanding the computer unit and adding a data memory for monitoring changes in time on test set-ups/test specimens. Monitoring of the operation of an hydraulic pulsing machine is frequently desirable in long-term tests. Thus it can be meaningful, for example, to switch off the dynamic excitation of the working cylinder when the first cracks appear on test specimens or to switch off the hydraulic pulsing machine completely if a part breaks off a test set up.

Figure 8:
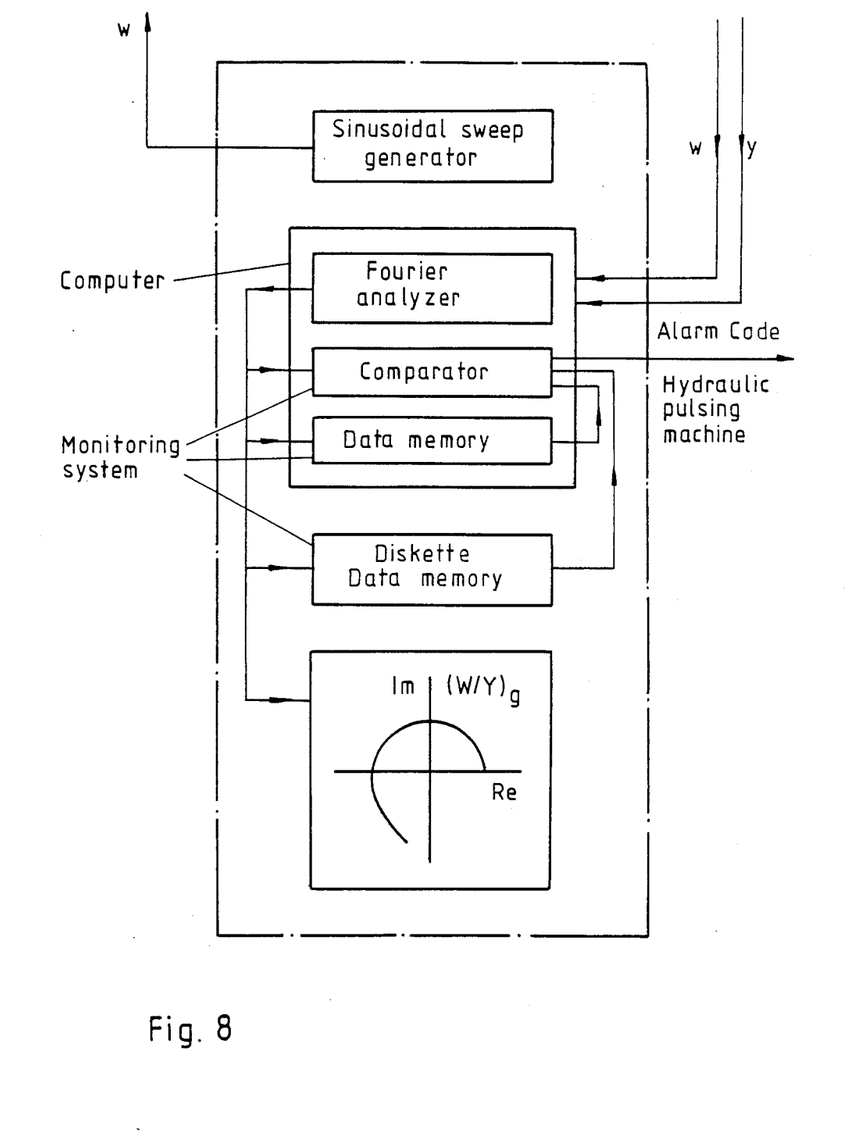
FIG. 8 shows a schematic block diagram of a device according to FIG. 7 with additional data memories and a comparator.

As has already been mentioned, the transfer characteristic of the controlled system of the hydraulic pulsing machine is dependent on the test set-up/test specimen. If the dynamic behavior of the test set-up/test specimen changes, therefore, a change will occur in the transfer characteristic of the controlled system. This change can be detected by means of the locus (w/y)g. In order to determine in time whether the elasto-mechanical behavior of the test set-up/test specimen is changing, it is thus sufficient to compare the loci (w/y)g, determined at different points in time, with each other at regular intervals. For this it is necessary to provide the measuring facility with a data memory in which the coordinates of loci can be stored so that the values of the locus measured at time "to" can be compared in a comparator with those of the current locus at time "to+Δt" (FIG. 8). In this arrangement, "Δt" can be a time interval in the order of magnitude of minutes or even months.

The comparator operates on a digital basis. It compares at different frequencies in each case the coordinates of the two loci to be compared and adds the resultant quadratic differences together. If the value of the sum of the deviations exceeds a predetermined limit value, the alarm code of the hydraulic pulsing machine is triggered. Depending on the type of computer used (for the Fourier analysis), it is recommended to implement the comparator construction either primarily on hardware bases or on software bases.

Two different possibilities exist for experimentally determining the locus (w/y)g during long-term tests:

(a) The set value of the current test is an electric signal having a wide-band frequency spectrum. In this case, this set-value signal can be correlated with the corresponding actual value in the Fourier analyzer and the locus (w/y)g can be continuously determined during the current test.

(b) The set value of the current test is an electric signal having a narrow-band frequency spectrum (possibly a line spectrum). In this case, it is no longer possible to draw conclusions from this set value and the corresponding actual value as to the variation of the locus (w/y)g. It is then necessary to stop the long-term test at regular time intervals and to perform the control loop excitation—as in the PID adjustment process—via the sine-wave sweep generator. The load alternations occurring during these monitoring examinations have no significance for the long-term test since both the number of load alternations sustained and the amplitude of excitation are low.

It can be assumed that changes in the elasto-mechanical behavior of the test set-up/test specimen can be detected early by means of the procedure proposed here. In many tests, this can yield a great saving in time since the frequently conducted optical checks of the test set-up/test specimen and the assembly and disassembly work often connected with this can be omitted. It is also to be recommended to store the values of some (w/y)g loci measured last in time in a diskette data store. This provides the possiblility of analyzing the variation with time of a damage case in detailed form.

I claim:

1. A method of adjusting PID characteristics of a controller compensating network fitted in the closed control loop of a hydraulic pulsing machine coupled with a test specimen, and with the method comprising the steps of:

(a) determining the closed loop stability locus of the network by applying a set-value wide band frequency signal in the form of a swept sine or random signal to the control loop and the set-value signal and resultant signal is measured and correlated, and (b) adjusting the PID characteristics of the network until the stability locus is located at a desired position.

2. Apparatus for determining the PID characteristics of a controller compensating network fitted in the closed control loop of a hydraulic pulsing machine, and with the apparatus comprising, in combination, signal generator means comprising a sine-sweep or random signal generator adapted to be coupled with the loop for applying a set value signal to the network, and measuring means adapted to be coupled with the loop for correlating actual and set signal values within the loop.

* * * * *